United States Patent

Meidan

[15] 3,680,045

[45] July 25, 1972

[54] DATA TRANSMISSION ECHOING UNIT

[72] Inventor: Reuven Meidan, Stony Brook, L. I., N.Y.

[73] Assignee: Applied Digital Data Systems, Inc.

[22] Filed: Aug. 18, 1970

[21] Appl. No.: 64,730

Related U.S. Application Data

[63] Continuation-in-part of Ser. No. 856,538, Sept. 10, 1969, abandoned.

[52] U.S. Cl. ....................................................340/146.1 BA

[51] Int. Cl. ....................................................G08c 25/02

[58] Field of Search ....................................340/146.1; 235/153

[56] References Cited

UNITED STATES PATENTS

| | | | |
|---|---|---|---|
| 3,336,467 | 8/1967 | Frey, Jr. | 235/153 |
| 3,336,576 | 8/1967 | Sourgens | 340/146.1 |
| 3,452,330 | 6/1969 | Avery | 340/146.1 X |

*Primary Examiner*—Charles E. Atkinson

*Attorney*—Morton, Bernard, Brown, Roberts & Sutherland, John W. Behringer, Eugene L. Bernard, Martin J. Brown, James N. Dresser, W. Brown Morton, Jr., John T. Roberts and Malcolm L. Sutherland

[57] ABSTRACT

Apparatus for receiving pulse coded signals from a signal source such as an automatic data processing system and for returning the same signals to that source to permit detection and correction of transmission errors. The signals are applied to an input memory device and to the local utilizing device. Once a complete character is in that memory, it is compared with precoded On and Off commands to determine whether it is a control signal for the apparatus. If the apparatus is on, the character is returned to the signal source. If a signal is generated at the local utilizing device, the apparatus switches itself off to prevent confusion of signals, and the apparatus sends the signal source a character indicating it has switched off.

9 Claims, 4 Drawing Figures

INVENTOR
REUVEN MEIDAN

BY McLean, Morton & Boustead

ATTORNEYS

INVENTOR
REUVEN MEIDAN

BY McLean, Morton & Boustead

ATTORNEYS

DATA TRANSMISSION ECHOING UNIT

This application is a continuation-in-part of U.S. Pat. application Ser. No. 856,538, filed Sept. 10, 1969 and now abandoned.

The present invention pertains to data communication. More particularly, the present invention pertains to apparatus for receiving data transmitted in the form of pulses and returning to the transmission source an echo of that data to permit the source to determine whether a transmission error has occurred.

The widespread use of automatic data processing equipment has been accelerated by the use in conjunction with such equipment of remote data input and output terminals. By means of such remote terminals, data users might be many miles from the data processing equipment, and one set of data processing equipment can become available to a large number of users on a shared time basis. A problem which causes many potential shared time users to choose not to use such capability is the possibility of an error being introduced into data during transmission between the input/output equipment and the data processing equipment. Such errors might result from extraneous pulses occurring on the transmission lines. Alternatively, such errors might occur as a result of a transmitted pulse losing its shape and not being recognized at the receiving end. Such errors result in the received data differing from that which was transmitted. If the transmission consists of text such as wire service news dispatches, these transmission errors are not a great problem because generally the text can still be understood even though an occasional letter is wrong. However, such errors become more of a problem in the transmission of numerical data since a numerical error would likely not be apparent to the receiving user. This problem has caused many potential time shared data processing equipment users to choose not to use such equipment.

There has been developed equipment used with such data processing systems which causes the data processing equipment to return to the remote input/output terminal the signals received by the processing equipment. This enables the user to determine that the data he has transmitted to the processing equipment has been properly received. If the returned data are identical with those sent, it is assumed that no error has been introduced during the transmission. On the other hand, if the returned data differs from that transmitted, the data is retransmitted or other corrective action is taken on the assumption that the error occurred during transmission from the remote terminal to the data processing equipment.

While this equipment permits the user to verify that the input data applied to the data processing equipment is correct, there is still a possibility that once the data processing equipment has performed operations on the input data and the data processing equipment provides output information to the remote terminal, errors might occur during the transmission of this output data. The user has nothing with which to compare the output data which he receives, and so he has no way of determining whether an error has occurred during transmission from the data processing equipment.

The present invention is a data reception and retransmission unit for use in conjunction with a remote data terminal to return to a data source the signals received at the remote terminal, thereby permitting comparison by the data source of the returned data with that transmitted so that errors can be detected. The data source might be time shared data processing equipment. That equipment can include means to cause retransmission or other corrective action to be taken should an error be detected.

These and other aspects and advantages of the present invention are more apparent in the following detailed description and claims, particularly when considered in conjunction with the accompanying drawings in which like parts bear like reference numerals. In the drawings:

Figure 1:
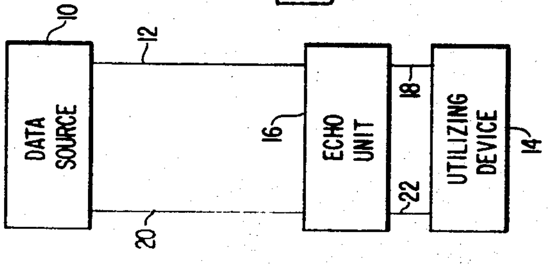
FIG. 1 is a block diagram of a data processing system incorporating the present invention.

As depicted in FIG. 1, data source 10, which for example might be centrally located, time shared automatic data processing equipment such as a digital computer, provides output signals on line 12 which signals are to be received at utilizing device 14. Utilizing device 14 might be any remote data terminal capable of utilizing the data signals. By way of example, utilizing device 14 might be a character-oriented receiving device such as a teleprinter providing access to and from data source 10, perhaps on a time shared basis. Alternatively, of course, utilizing device 14 could be additional automatic data processing equipment, and device 14 is not required to have a transmitting capability. Instead of applying the data signals from source 10 directly to the utilizing device 14, line 12 applies these signals to echo unit 16 which in turn applies the signals via line 18 to utilizing device 14. Echo unit 16 additionally is capable of transmitting the data signals received by it back to data source 10 via line 20. In addition, echo unit 16 can receive signals on line 22 from utilizing device 14. When echo unit 16 receives such signals on line 22, it stops returning to data source 10 the data signals received by it from source 10, and it sends a signal to source 10 to indicate this transition. As a consequence, source 10 receives the data being generated by utilizing device 14, and so there is no confusion of data.

Figure 2:
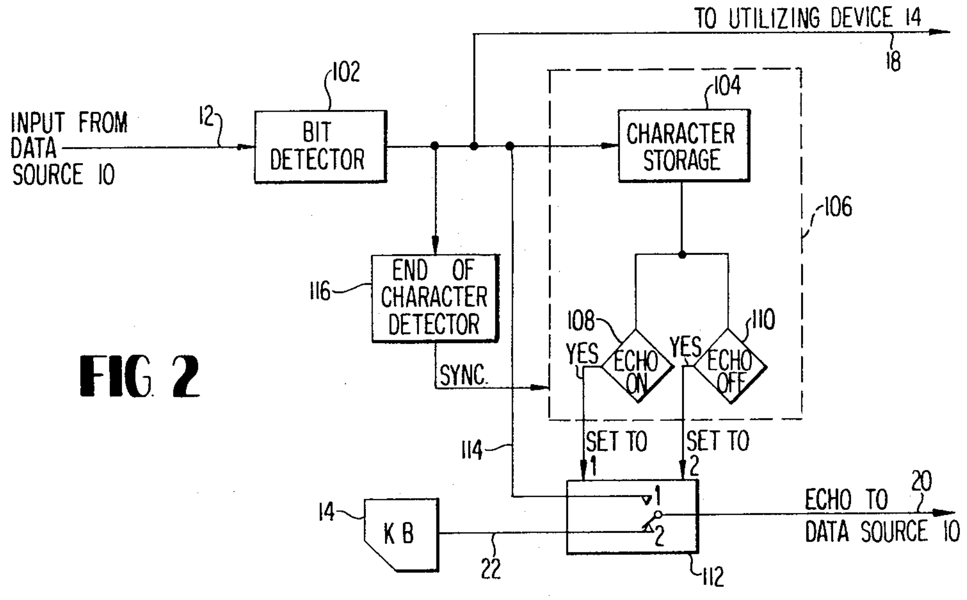
FIG. 2 is a logical block diagram of the data reception and retransmission equipment of the present invention.

FIG. 2 depicts the logical components of echo unit 16. Input line 12, which brings signals from data source 10, is connected to bit detector 102 which detects the two level input signals yet ensures that noise pulses on line 12 are not interpreted as data bits. Line 18, which applies the received data to utilizing device 14, is connected to the output of bit detector 102. Thus, bit detector 102 shapes the received pulses prior to their application to utilizing device 14 to ensure that proper signals are received by the utilizing device. The output of bit detector 102 is applied to character storage unit 104 within processor 106 of echo unit 16. Character storage unit 104 receives each data character serially bit by bit and applies each multi-bit data character in parallel to echo-on sensor 108 and to echo-off sensor 110.

Output line 20 returns signals to data source 10 from switching unit 112. If character storage unit 104 has stored within it an "echo on" character, then echo-on sensor 108 causes switching unit 112 to switch to its first condition in which output line 20 is coupled via line 114 to the output of bit detector 102. Subsequent data bits received on line 12 are then applied through switching unit 112 to output line 20 which returns these data bits as the echo signal to data source 10. If the character storage unit 104 has stored within it the "echo off" command, then echo-off sensor 110 causes switching unit 112 to assume its second condition in which output line 20 is coupled to line 22 from the keyboard of utilizing device 14. As a consequence, the input signals on line 12 are no longer echoed back to data source 10, and signals subsequently generated by keyboard 14 are applied to data source 10.

The data bits from bit detector 102 are also applied to end-of-character detector 116 which detects the code indicating the end of a data character and provides synchronization signals to processor 106 to ensure that transitions from the echo off condition to the echo on condition, and vice-versa, occur at the end of a character.

Figure 3:
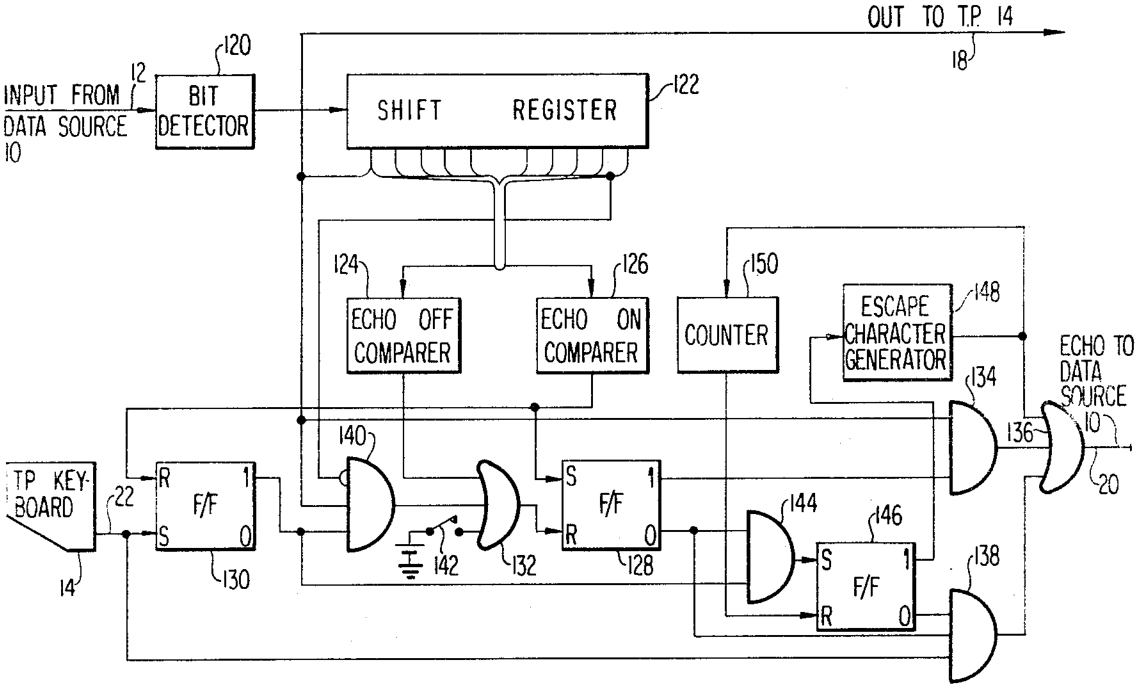
FIG. 3 is a logical block diagram of the data reception and retransmission equipment of the present invention showing more detail than FIG. 2.

FIG. 3 provides a more detailed logical block diagram of apparatus in accordance with the present invention suitable for use as echo unit 16. The input data bits on line 12 are applied to bit detector 120 which again detects the two level bit signals and ensures that noise pulses on line 12 are not interpreted as data bits. From bit detector 120 the data bits are applied to the input of shift register 122 which includes a number of stages equal to the number of bits in each data character. Thus, for example, if each data character includes a one-bit start code, seven data bits, a parity bit, and a one-bit stop code, giving a total of 10 bits, then shift register 122 includes 10 stages. The outputs of the stages of shift register 122 are applied in parallel to echo-off comparer 124 and to echo-on comparer 126. The output of the first stage of shift register 122 is also applied to output line 18 which is connected to utilizing device 14 which for example might be a teleprinter. If shift register 122 has stored within it the "echo off" signal, then echo-off comparer 124 applies a signal through OR gate 132 to the reset input of bistable multivibrator or flip-flop 128. In like manner, if shift register 122 has stored within it the "echo on" signal, then echo-on comparer 126 applies a signal to the set input of flip-flop 128 and to the reset input of flip-flop 130. The one output of flip-flop 128 is connected to the first input of AND gate 134, the second input of which is connected to the output of the first stage of shift register 122. The output of AND gate 134 is connected to one input of OR gate 136, the output of which is tied to output line 20 which returns echo signals to data source 10.

The teleprinter 14 keyboard has its output connected by line 22 to the set input of flip-flop 130 and to one input of AND gate 138. The one output of flip-flop 130 is connected to the first noninhibiting input of INHIBITED-AND gate 140, the second noninhibiting input of which is connected to the output of the first stage of shift register 122. INHIBITED-AND gate 140 has its inhibiting input connected to the output of the last stage of shift register 122 and its output tied to one input of OR gate 132. The third input of OR gate 132 is connected to one terminal of switch 142, the second terminal of which is connected to a suitable voltage source to reset flip-flop 128.

The zero output of flip-flop 128 and the one output of flip-flop 130 are connected to the two inputs of AND gate 144, the output of which is tied to the set input of flip-flop 146. The one of flip-flop 146 is connected to the input of character generator 148 which generates an "escape" character to signal the shutting off of echo unit 16 due to the generation of a data character at the teleprinter 14 keyboard. This escape character passes from character generator 148 through OR gate 136 to output line 20 which transmits it to data source 10 to indicate to the data source that subsequent characters on line 20 are originated at the teleprinter 14 keyboard and are not echo signals. The escape character generator 148 output is also applied to suitable means for detecting the end of the escape character, such as bit counter 150, which at the end of the escape character applies a signal to the reset input of flip-flop 146. The zero output of flip-flop 146 is connected to one input of AND gate 138 which also receives an input from the zero output of flip-flop 128. The output of AND gate 138 is coupled through OR gate 136 to output line 20.

In the quiescent condition with echo unit 16 off and no data character being generated by the teleprinter 14 keyboard, flip-flop 128 is reset, and so no input is applied by that flip-flop to AND gate 134. Consequently gate 134 is blocked, and any data characters then received on line 12 are applied by line 18 to teleprinter 14 input but are not echoed via line 20 to data source 10. Assuming enough time has elapsed for character generator 148 to have operated, flip-flop 146 is reset regardless of the condition which has caused echo unit 16 to turn off. Therefore, the zero outputs of flip-flops 128 and 146 apply inputs to AND gate 138. Since flip-flops 128, 130 and 146 are caused to change state by appropriate voltage transitions and not be voltage levels, the state of flip-flop 130 is irrelevant. Any data signals generated by keyboard 14 pass through AND gate 138 and OR gate 136 to output line 20 which applies them to data source 10.

Data characters from source 10 are passed by bit detector 120 to shift register 122. The contents of shift register 122 are applied in parallel to echo-off comparer 124 and to echo-on comparer 126. When data source 10 sends the "echo on" command to echo unit 16 and that data character is within shift register 122, echo-on comparer 126 sets flip-flop 128. The one output of flip-flop 128 enables AND gate 134. Subsequent data characters from source 10 are applied bit by bit in serial fashion from the output of the first stage of shift register 122 through AND gate 134 and OR gate 136 to output line 20, which echoes those data characters back to data source 10. Thus, so long as flip-flop 128 remains set, each data character received from data source 10 is echoed back to data source 10. Since flip-flop 128 is no longer providing a zero output, AND gate 138 is inhibited. Should data source 10 send the "echo off" command, the presence of that character in shift register 122 causes echo-off comparer 124 to apply a signal through OR gate 132 to reset flip-flop 128. AND gate 134 is therefore blocked, and data characters on line 12 are no longer echoed back to data source 10. The zero output from flip-flop 128 is applied to AND gates 138 and 144. AND gate 138 is still receiving the zero output from flip-flop 146. Consequently, any data characters generated by the teleprinter 14 keyboard are applied through AND gate 138 and OR gate 136 to output line 20 which transmits them to data source 10.

If echo unit 16 is on so that flip-flop 128 is set and the operator at the echo unit desires to shut off the echo unit, he momentarily depresses switch 142 which applies a signal through OR gate 132 to reset flip-flop 128.

If echo unit 16 is on and a character is generated at the teleprinter 14 keyboard, echo unit 16 shuts itself off and generates an "escape" character which is transmitted to data source 10 to inform the data source that subsequent characters are characters from the teleprinter 14 keyboard and are not echoed characters. The first data character from teleprinter 14 causes a signal to be applied to the set input of flip-flop 130. Since the echo unit is on, flip-flop 128 is set, and so AND gate 138 is blocked; therefore, this first data character from the teleprinter 14 keyboard is not applied to line 20. The one output of flip-flop 130 is applied to AND gate 140 and to AND gate 144. In the usual teleprinter codes, the start code is a low level, and the stop code is a high level. The outputs of the first and last stages of shift register 122 are applied to INHIBITED-AND gate 140 so that with a full data character within shift register 122, the last stage of shift register 122 applies a low level to the inhibiting input of INHIBITED-AND gate 140 while the first stage of shift register 122 applies a high level to the uninhibited input of gate 140. With flip-flop 130 set, gate 140 then applies a signal through OR gate 132 to reset flip-flop 128, removing the input to AND gate 134, and ending the echoing of signals back to data source 10. The zero output of flip-flop 128 is applied to AND gate 144 which has been enabled by the ONE output of flip-flop 130. Consequently, gate 144 sets flip-flop 146. The zero output of flip-flop 128 is also applied to AND gate 138 which receives the generated character from the teleprinter 14 keyboard, but the setting of flip-flop 146 causes gate 138 to remain blocked, and so this first generated character still can not pass beyond gate 138. The one output of flip-flop 146 activates escape character generator 148 to generate the "escape" character which passes through OR gate 136 and is applied by line 20 to data source 10. At the end of the "escape" character, counter 150 resets flip-flop 146, and gate 138 is now receiving inputs from both flip-flops 128 and 146. Consequently, each subsequent data character from the teleprinter 14 keyboard passes one bit at a time through AND gate 138 and OR gate 146 and is applied by line 20 to data source 10. The next time echo-on comparer 126 generates an output, flip-flop 130 is reset.

Figure 4:
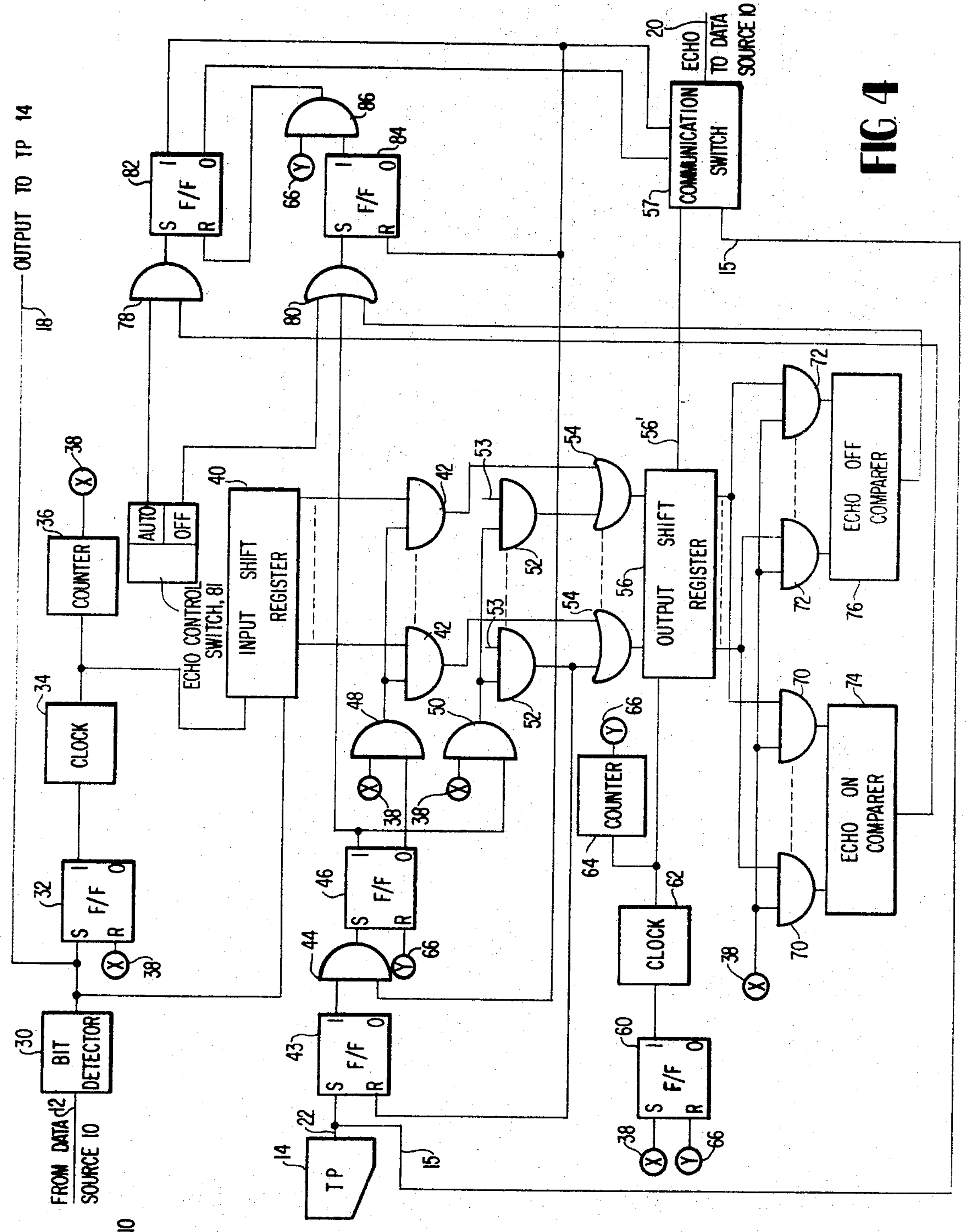
FIG. 4 is a block diagram depicting in greater detail one illustrative embodiment of the data reception and retransmission equipment of the present invention.

FIG. 4 illustrates one representative example of more detailed implementation of echo unit 16. As depicted in FIG. 4, the data received by echo unit 16 on line 12 from data source 10 is applied to bit detector 30. Bit detector 30 might be any device capable of detecting two-level signals, and might be, for example, a device including the capability of ensuring that noise pulses on line 12 are not interpreted as data bits. Line 18, which applies the received data to utilizing device 14, is connected to the output of bit detector 30. In addition, the output of bit detector 30 is connected to the set input of bistable multivibrator or flip-flop 32. The one output of flip-flop 32 is connected to clock 34 to provide an enabling signal thereto. Clock 34 is a gated free-running pulse generator having a frequency equal to the input data bit rate. The output of clock 34 is applied to counter 36 which counts the clock pulses and at a preset pulse count applies a signal on its output terminal 38. For the sake of clarity, the several inputs to which these clock pulses are applied from output terminal 38 are designated by the symbol (x) in FIG. 4. This output terminal 38 is connected to the reset input of flip-flop 32.

The data bits from bit detector 30 are applied as a signal input to input shift register 40 which receives shift pulses from clock 34. Shift register 40 includes a number of stages equal to the number of bits in each data character. Thus, for example, if each data character includes a one bit start code, seven data bits, a parity bit and a two bit stop code, giving a total of 11 bits, then shift register 40 includes 11 stages. Each stage within shift register 40 has its output connected as an input of an AND gate 42. Thus, if shift register 40 includes 11 stages, then 11 AND gates 42 are required.

The input generator of utilizing device 14, which in FIG. 4 is illustratively depicted as a teleprinter keyboard, is connected by line 22 to the set input of flip-flop 43, the one output of which is tied to one input of AND gate 44 within echo unit 16. The output of AND gate 44 is connected to the set input of flip-flop 46. The zero output of flip-flop 46 is connected as an input of AND gate 48, the second input of which is tied to output terminal 38 of clock 36 and the output of which is applied as an input to each AND gate 42. The one output of flip-flop 46 is connected as an input of AND gate 50 which also has its second input tied to terminal 38 from clock 36. A second series of AND gate 52 is provided equal in number to the number of stages in shift register 40, and each AND gate 52 has one input connected to he output of AND gate 50. The second inputs 53 of the several AND gates 52 are connected to circuitry which provides a special code signal to indicate that an input character has been generated by utilizing device 14. Thus, for example, these second inputs 53 of the AND gates 52 might be hard-wired to ground or to suitable voltage levels in a coded manner indicative of the data bits within this special character known as the "Escape" character. The output of one of the AND gates 52 is also connected to the reset input of flip-flop 43. A series of OR gates 54 is provided equal in number to the number of stages in shift register 40. Each OR gate 54 receives as inputs the output of an associated AND gate 52 and provides an output to a stage within output shift register 56. Thus, for example, the first stage of input shift register 40 is connected to the first AND gate 42 which in turn is connected to an input of the first OR gate 54 which has its second input connected to the output of the first AND gate 52 and its output connected to the first stage of output shift register 56. Likewise, the second stage of shift register 40, the second AND gate 42, the second OR gate 54, the second AND gate 52, and the second stage of shift register 56 are connected in circuit, etc. Thus, if the AND gates 42 are enabled by a signal from AND gate 48, the contents of input shift register 40 are transferred in parallel to output shift register 56. Alternatively, if AND gates 52 are enabled by an output from gate 50, the Escape character coded by the second inputs 53 of the AND gates 52 is transferred in parallel into output shift register 56. The serial output of shift register 56 is connected via line 56' to one input of communication switch 57, the second input of which is connected via line 15 to the output of teleprinter 14.

Output terminal 38 from clock 36 is additionally connected to the set input of flip-flop 60. The one output of flip-flop 60 is connected to clock 62 to provide an enabling input thereto. Clock 62 is of the same type as clock 34, and when enabled by flip-flop 60, clock 62 provides output pulses at a frequency equal to the data bit rate. The output of clock 62 provides shift pulses to shift register 56. In addition, the output of clock 62 is connected to counter 64 which provides a signal at its output terminal 66 after counting a number of pulses equal to the number of bits in each data character. For clarity, in FIG. 4 the several inputs to which output terminal 66 of counter 64 is connected are designated by the symbol (y). Thus, the output of counter 64 is connected to the reset input of flip-flops 46 and 60. A set of AND gates 70 equal in number of stages in shift register 56 is provided. Each AND gate 70 has one of its input terminals connected to the output of an uniquely associated stage of output shift register 56. Likewise, a set of AND gates 72 is provided equal in number to the number of stages in output shift register 56, and each AND gate 72 has one of its input terminals connected to the output of an uniquely associated stage of output shift register 56. Each AND gate 70 and each AND gate 72 has its second input connected to output terminal 38 of counter 36. Each AND gate 70 has its output connected to the input of an uniquely associated stage of Echo On comparer 74. Likewise, each AND gate 72 has its output connected to the input of an uniquely associated stage of Echo Off comparer 76. Thus, when clock 36 provides an enabling signal to AND gates 70 and 72, the contents of output shift register 56 are transferred in parallel to both Echo On comparer 74 and Echo Off comparer 76.

Echo On comparer 74 has its output connected as an input of AND gate 78, while Echo Off comparer 76 has its output connected as an input of OR gate 80. Two-position, manually operable Echo Control switch 81 provides a signal to the second input of AND gate 78 when switch 81 is in its "Aumtomatic" position and provides an input to OR gate 80 when switch 81 is in its "Off" position. The third input of OR gate 80 is connected to the one output of flip-flop 46. AND gate 78 has its output connected to the set input of flip-flop 82. The output of OR gate 80 is connected to the set input of flip-flop 84. The one output of flip-flop 82 is connected to the second input of AND gate 44 and to the reset input of flip-flop 84. The one output of flip-flop 84 is tied to the first input of AND gate 86, the second input of which is connected to output terminal 66 from counter 64. The output of AND gate 86 is connected to the reset input of flip-flop 82.

The one output of flip-flop 82 provides the "Echo On" signal which is applied to communication switch 57 to close that switch to line 56' to cause switch 57 to pass the output from shift register 56 to output line 20 by means of which the data characters are returned from echo unit 16 to data source 10. Likewise, the zero output of flip-flop 82 is the "Echo Off" signal and is applied to communication switch 57 to close that switch to line 15 so that the data character in shift register 56 is not applied to output line 20, but instead data characters generated at the teleprinter 14 keyboard are applied to line 15.

Assume that echo unit 16 is off, that no character is being generated by teleprinter 14, and that Echo Control switch 81 is in its automatic position. Data received on line 12 from data source 10 is made up of pulses or data bits which, by the time they reach echo unit 16, may be considerably distorted. Bit detector 30 receives these pulses and in response generates undistorted pulses which are then transmitted by line 18 to utilizing device 14. Thus, echo unit 16 shapes the received data pulses to provide clean signals for utilizing device 14.

Each data character commences with a start bit which causes bit detector 30 to apply a pulse to the set inlput of flip-flop 32. As a result flip-flop 32 enables clock 34 which thereafter generates clock pulses at the received signal bit rate. The output of clock 34 is utilized as shift pulses by shift register 40 which also receives the received data character from bit detector 30. Thus, the received character is shifted into input shift register 40. The pulses from clock 34 are counted by counter 36, and when counter 36 has counted a number of pulses equal to the number of bits in a received data character, the counter applies a signal to its output terminal 38. This signal resets flip-flop 32 to disable clock 34 until the next data character is received.

Since no signal is being generated by teleprinter 14, flip-flop 46 is in its reset condition and applies an enabling signal to AND gate 48. The output pulse from counter 36 triggers AND gate 48 to apply an enabling signal to each AND gate 42. As a result, the contents of input shift register 40 is transferred through OR gates 54 to output shift register 56. The pulse from clock 36 also enables each AND gate 70 and each AND gate 72, and so the data character is compared with a predetermined Echo On signal within comparer 74 and with a predetermined Echo Off signal in comparer 76. If the received signal is the Echo On signal, comparer 74 applies a signal to AND gate 78. With Echo Control switch 81 in the automatic position, AND gate 78 is enabled, and this signal from comparer 74 causes gate 78 to set flip-flop 82. The one output of flip-flop 82 closes communication switch 57 to line 56' and resets flip-flop 84.

The output pulse from clock 36 also sets flip-flop 60 which enables clock 62 to apply shift pulses to shift register 56. Consequently, the date is shifted out of register 56 to communication switch 57, which, therefore, passes the data character to output line 20. When counter 64 has counted pulses equal in number to the number of bits within the data character, it applies a signal on output terminal 66. This signal resets flip-flop 60 and is applied to the reset input of flip-flop 46. Once communication switch 57 is closed to line 56' by the one output of flip-flop 82, each data character from shift register 56 passes to output line 20. Line 20 returns that data character to data source 10 in which it can be compared with the transmitted character to determine whether an error has been introduced in transmission.

Generally, the inherent delays in gates 42, 52, 54, 70 and 72, flip-flop 60, and shift register 56 ensure that the proper sequence of events occurs upon generation of a signal by counter 36—that is, first the data character is transferred in parallel from input shift register 40 to output shift register 56, then it is compared in comparers 74 and 76, then it is shifted out through communication switch 57. Should a race condition exist, suitable delay techniques, such as delay multivibrators, can be utilized to ensure proper operation.

When data source 10 determines that characters should no longer be echoed back to it, the data source transmits the Echo Off signal. This signal passes through input shift register 40 to output shift register 56 which in turn applies it to comparers 74 and 76. In response, comparer 76 sends a signal through OR gate 80 to the set input of flip-flop 84. The one output of flip-flop 84 enables AND gate 86, and when counter 64 generates its end of character signal at terminal 66, gate 86 resets flip-flop 82. The zero output of flip-flop 82 closes communication switch 57 to line 15 to prevent the application of the data characters from line 56' to output line 20. The communication switch remains in this position until the next Echo On command is received from data source 10.

Preferably, the Echo On and Echo Off signals transmitted by data source 10 are characters to which utilizing device 14 does not respond by printing. If desired, immediately after commanding Echo On, data source 10 can transmit a verification character, which also might be a non-printing character of utilizing device 14, to permit data source 10 to verify that echo unit 16 has in fact turned on.

Should a signal be generated by utilizing device 14 for transmission to data source 10, flip-flop 43 is set to apply a continuous signal to AND gate 44. If communication switch 57 is closed to line 56' at that time by the one output of flip-flop 82, then AND gate 44 sets flip-flop 46. This removes the enabling input from AND gate 48 and applies an enabling input to ANd gate 50. When counter 36 has next counted a complete data character, it generates a pulse which causes gate 50 to apply an input to each AND gate 52. As a consequence, the Escape character coded into the second inputs 53 of AND gates 52 passes through OR gates 54 to shift register 56 and to the reset input of flip-flop 43. This Escape character is then transmitted via line 56' through communication switch 57 to output line 20 which applies it to data source 10. The data source 10 can include instructions which enable it to respond in an appropriate manner to the Escape character. The one output of flip-flop 46 also passes through OR gate 80 to set flip-flop 84. After counter 64 indicates that the Escape character has been transmitted through switch 57, AND gate 86 resets flip-flop 82 to close switch 57 to line 15 so that the subsequent input from teleprinter 14 passes to line 20.

Since the first character from utilizing device 14 is required to initiate this Escape routine, that first character preferably is not a part of the message being sent from device 14 to data source 10, but instead is any character desired to cause the Escape routine.

Data source 10 can include instructions which cause it to respond in the desired manner to the Escape character and to detection of a transmission error. Generally, the Escape character is followed by signals applied to data source 10 from utilizing device 14 which signals control subsequent operation of data source 10. Data source 10 is programmed to compare received characters with those transmitted to detect transmission errors. Source 10 can be programmed to respond in any of a number of ways upon detection of an error. By way of examples, upon detection of an error, data source 10 can retransmit a complete message or a portion of a message, either with or without also sending an alerting signal, or data source 10 can transmit an alarm message to activate an alarm indicator either at utilizing device 14 or at a supervisory location, or data source 10 can accumulate historical data on errors and in response thereto can alter its communication program in an appropriate manner.

Should the operator at utilizing device 14 choose to prevent echoing of the received data characters back to data source 10, he can place Echo Control switch 81 in its Off position, causing flip-flop 84 to be set. At the next output pulse from counter 64, flip-flop 82 receives a reset pulse, and the zero output of flip-flop 82 closes communication switch 57 to line 15 to prevent passage of the data characters from output shift register 56 to line 20. Flip-flop 82 remains reset and flip-flop 84 remains set until after the Echo Control switch 81 has been returned to its automatic position.

The above embodiments are illustrative of the forms which the present invention can take and thus demonstrate that although preferred embodiments have been described, numerous modifications and rearrangements could be made within the scope of the invention.

What is claimed is:

1. Apparatus for receiving coded data characters from a data source and transmitting those data characters comprising:

an input line adapted for connection to a data source for receipt of data character signals therefrom;

storage means connected to said input line for storing received data character signals;

a first output line connected to said storage means and adapted for connection to a data utilizing device for transmittal thereto of data character signals after receipt from the data source;

comparison means coupled to said storage means and incorporating preset comparison characters for comparing stored data character signals with the preset comparison characters and for generating comparison means output signals when a stored data character signal matches a preset comparison character;

a second output line adapted for connection to the data source for transmittal back to the data source of data character signals received therefrom; and switching means coupled to said second output line, to the output of said comparison means, and to said storage means, said switching means in response to a first comparison means output signal assuming a first condition in which data character signals received from the data source are passed from said storage means to said second output line for transmittal back to the data source and in response to a second comparison means output signal assuming a second condition in which data character signals in said storage means are blocked from said second output line.

2. Apparatus a claimed in claim 1 in which said storage means includes a shift register means and in which the apparatus further comprises clock means responsive to receipt of a data character signal for applying to said shift register means sufficient shift pulses to transfer that received data character signal through said shift register means.

3. Apparatus as claimed in claim 1 further comprising gating means connected to said switching means and adapted for connection to a local data character source for causing said switching means to assume its second condition upon generation of a data character at the local data character source.

4. Apparatus as claimed in claim 3 further comprising character generating means coupled to said gating means for applying a preset character to said output line upon generation of a data character at the local data character source.

5. Apparatus as claimed in claim 4 in which said gating means includes delay means responsive to application of the preset character from said character generating means for delaying the assumption of the second condition by said switching means until the preset character has passed through said switching means to said output line.

6. Apparatus as claimed in claim 1 further comprising a data source connected to said input line for application of data character signals thereto and a data utilizing device connected to said first output line for receipt of data character signals therefrom.

7. Apparatus as claimed in claim 6 in which the data source is an automatic data processing equipment.

8. Apparatus as claimed in claim 7 in which the utilizing device is a teleprinter.

9. Apparatus as claimed in claim 7 in which the automatic data processing equipment is a digital computer.

* * * * *